M. L. SUMMERS.
DREDGE TUMBLER.
APPLICATION FILED OCT. 6, 1919.

1,352,997.

Patented Sept. 14, 1920.

Inventor:
Mark L. Summers.
by his Atty.

UNITED STATES PATENT OFFICE.

MARK LAFORE SUMMERS, OF HAMMONTON, CALIFORNIA, ASSIGNOR TO TAYLOR-WHARTON IRON AND STEEL COMPANY, OF HIGH BRIDGE, NEW JERSEY, A CORPORATION OF NEW JERSEY.

DREDGE-TUMBLER.

1,352,997.                     Specification of Letters Patent.     Patented Sept. 14, 1920.

Application filed October 6, 1919.  Serial No. 328,771.

*To all whom it may concern:*

Be it known that I, MARK LAFORE SUMMERS, a citizen of the United States, residing at Hammonton, in the county of Yuba and State of California, have invented certain new and useful Improvements in Dredge-Tumblers, of which the following is a specification.

The invention relates more particularly to lower tumblers for dredges, and it provides a lower tumbler wherein the flanged member or spool and the hub are embodied in a single casting. The flanged member has radial webs or spokes that terminate in a split hub or shaft-receiving element and ultimately rings are shrunk upon the ends of the hub. This construction makes for sound castings regardless of whether it is formed of manganese steel or carbon steel.

The nature, characteristic features and scope of the invention will more readily be understood from the following description taken in connection with the accompanying drawings, forming a part hereof, wherein—

Figure 1:
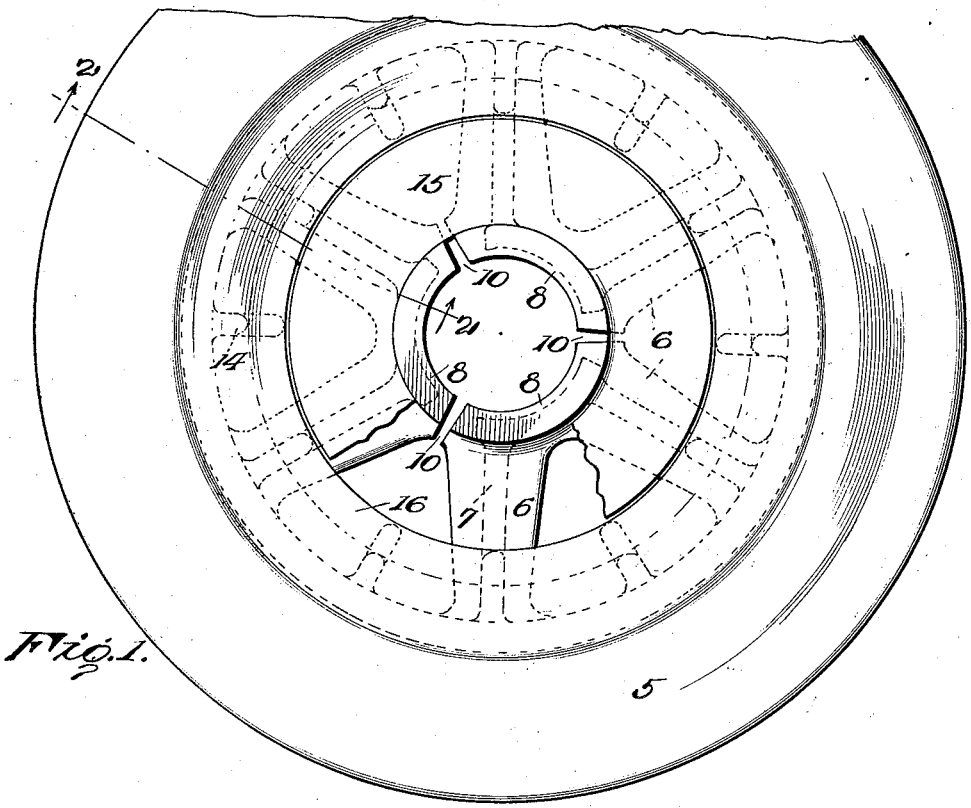
Figure 1 is an end view of a dredge tumbler embodying my invention.
Figure 2:
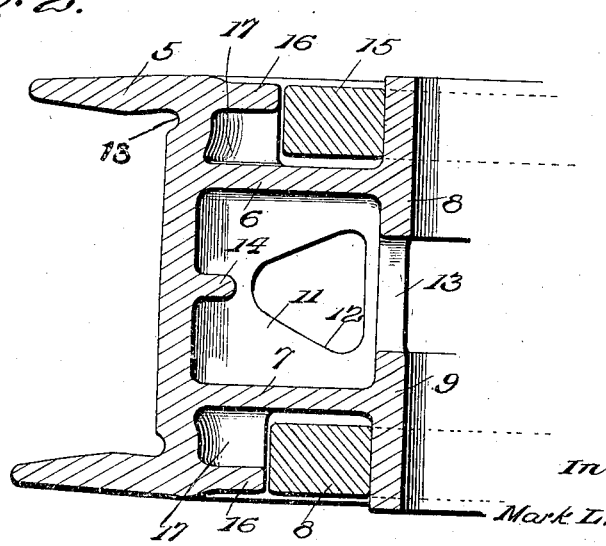
Fig. 2 is a section on line 2—2 of Fig. 1.

According to my invention, the flanged member of spool 5 is cast with radial webs or spokes 6 and 7, which terminate in hub or shaft-receiving elements 8 and 9. There are voids or gaps 10 between sundry of said webs so that the hub is split as it were to take care of shrinkage strains. There are endwise ranging webs 11 connecting the webs 6 and 7, and the compartments formed thereby have corridors 12 and 13. 14 are strengthening ribs intermediate the endwise ranging webs 11. 15 are relatively massive clamping rings or collars which are shrunk upon the hub ends. The overhangs 16 on the flanged member make substantially flush joints with the collars 15 and effectively close the ends of the tumbler. Webs 17 connect said overhangs with the hub-forming webs 6 and 7. The cored out portions 18 of the flanged member are useful, when present, to carry the chill.

Having described my invention, I claim:—

1. A dredge tumbler embodying a flanged member cast with hub-forming webs, collars secured upon the hub ends and overhangs on the flanged member coöperating with the collars to close the ends of the tumbler and having webs connecting them with the hub-forming webs.

2. A dredge tumbler embodying a flanged member cast with hub-forming webs, and other webs establishing therewith compartments having corridor communication.

3. A dredge tumbler embodying a flanged member provided with a split hub, collars shrunk upon the hub ends, and overhangs on the flanged member forming substantially flush joints with said collars.

4. A dredge tumbler embodying a flanged member cast with hub-forming webs having gaps or voids between sundry of them to take care of shrinkage strains, other webs establishing therewith compartments having corridor communication, and clamp provisions for the hub.

5. A dredge tumbler embodying a flanged member having cored out portions adjacent the flanges and having an integral split hub, and clamp provisions for the hub.

6. A dredge tumbler embodying a flanged member cast with hub-forming webs with gaps or voids to take care of shrinkage strains, said flanged member having marginal overhangs and webs connecting them with the hub-forming webs.

In testimony whereof I affix my signature.

MARK LAFORE SUMMERS.